United States Patent [19]

Hill et al.

[11] 4,107,658
[45] Aug. 15, 1978

[54] LIQUID LEVEL DETECTOR CIRCUITS

[75] Inventors: William Frank Hill, Stafford; Thomas Nicol, Lichfield, both of England

[73] Assignee: Lucas Electrical Limited, Birmingham, United Kingdom

[21] Appl. No.: 676,608

[22] Filed: Apr. 13, 1976

[30] Foreign Application Priority Data

Apr. 19, 1975 [GB] United Kingdom ............... 16262/75

[51] Int. Cl.² ............................................. G08B 21/00
[52] U.S. Cl. ................................. 340/620; 73/304 C; 323/75 P; 340/59
[58] Field of Search ............... 340/244, 59; 73/304 C; 323/75 E, 75 P

[56] References Cited

U.S. PATENT DOCUMENTS 3,868,664  2/1975  Hill .................................. 340/244 E

*Primary Examiner*—John W. Caldwell, Sr.
*Assistant Examiner*—Daniel Myer
*Attorney, Agent, or Firm*—Ladas, Parry, Von Gehr, Goldsmith & Deschamps

[57] ABSTRACT

A liquid level detector circuit includes a capacitive probe, a reference capacitor and two further capacitors connected as a capacitor bridge, with one terminal of each of the probe and the reference capacitor earthed and a common terminal of the further capacitors providing an output to a warning circuit. An oscillator is provided by two transistors connected so as alternately to interconnect the other terminals of each of the probe and the reference capacitor and to connect these to two different fixed potentials. The further capacitors charge slowly but discharge rapidly so that when there is any imbalance there is an excursion of the mean voltage at the common terminal during discharge which, depending on the polarity of the excursion can trigger the warning circuit.

6 Claims, 1 Drawing Figure

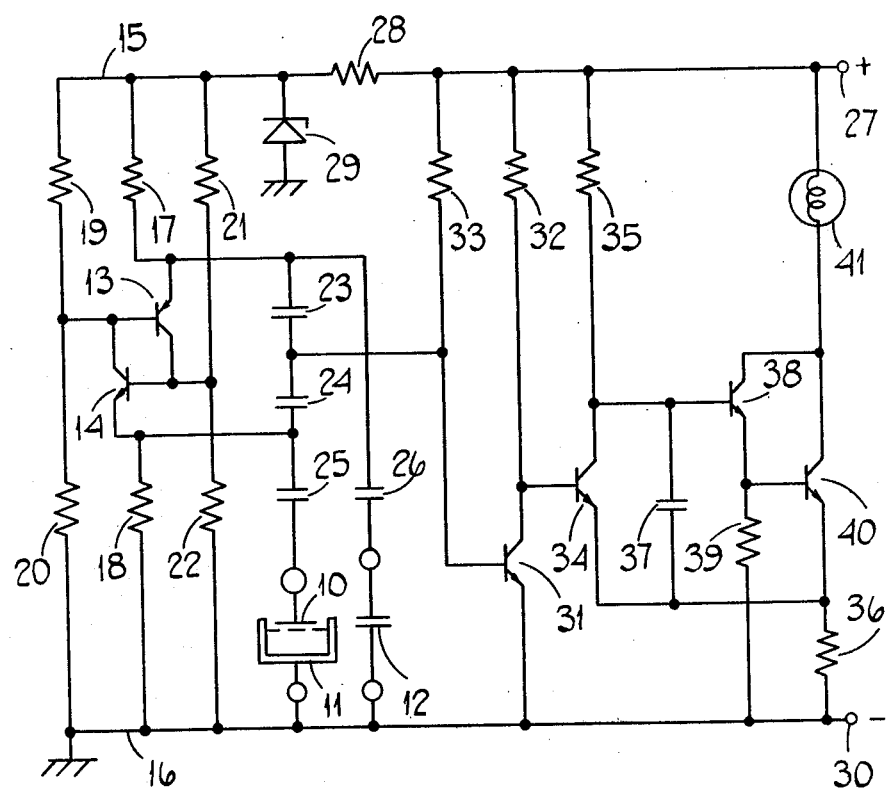

LIQUID LEVEL DETECTOR CIRCUITS

This invention relates to liquid level detector circuits intended primarily for use in road vehicle engine oil level monitoring.

It is an object of the invention to provide a liquid level detector circuit in a convenient form.

A liquid level detector circuit in accordance with the invention comprises a capacitive probe and a reference capacitor each having one terminal connected to a fixed potential rail in the circuit, means connecting the other terminals of said probe and said reference capacitor to switch means which operate when turned on to interconnect said other terminals and when turned off to impose two different potentials on said other terminals, and a warning circuit coupled to said other terminals and sensitive to the sense of the excursion of the mean potential on said terminals when said switch means is turned on.

The switch means is preferably in the form of a pair of transistors connected to the probe and the reference capacitor to act as an oscillator.

The warning circuit is preferably coupled to said other terminals of the probe and the reference capacitor by a pair of capacitors effectively forming a capacitive bridge.

An example of the invention is shown in the accompanying drawing which is a circuit diagram of the detector circuit.

In the circuit shown a capacitive probe 10 is provided which is mounted in a liquid container 11 so that it lies horizontally in the container at the lowest desired level of liquid therein. A reference capacitor 12 is also provided which has a capacitance which is between the capacitance of the probe 10 when immersed and the capacitance of the probe 10 when an air gap exists between the probe 10 and the level of liquid in the container 11. The probe 10 and the capacitance 12 and other capacitances are external to the remainder of the circuit which is so designed that it can readily be made as a single chip micro integrated circuit.

The circuit includes an oscillator incorporating a p-n-p transistor 13 and an n-p-n transistor 14. The base of each transistor is connected to the collector of the other and the emitters of the transistors 13, 14 are connected to a positive supply rail 15 and a negative supply rail 16 respectively via resistors 17, 18. Two resistors 19, 20 form a potential divider between the rails 15, 16 and their common point is connected to the base of the transistor 13 to bias it to a fixed voltage. A pair of resistors 21, 22 are similarly connected as a potential divider between the rails 15, 16 with their common point connected to the base of the transistor 14.

The emitters of the two transistors 13, 14 are interconnected by a pair of capacitors 23, 24 in series. The emitter of the transistor 14 is connected by a capacitor 25 to the probe 10, the container 11 being connected to the rail 16. The emitter of transistor 13 is connected via a capacitor 26 to one side of the reference capacitor 12 the other side of which is connected to the rail 16. The transistors 13, 14 turn on simultaneously and off simultaneously and thus constitute a switch. When the transistors are on, the probe 10 and said one side of the capacitor 12 are interconnected through the capacitors 25 and 26, whereas when the transistors are off the probe 10 has the voltage of the rail 16 imposed on it via the resistor 18 and the capacitor 25 whereas said one side of the capacitor 12 has the voltage of the rail 15 imposed on it via the resistor 17 and the capacitor 26.

The potential dividers 19, 20 and 21, 22 each extract more current when the transistors 13, 14 are on than can be supplied by the resistors 17 and 18. Hence the transistors 13, 14 conduct only whilst discharging the capacitance in the circuit and oscillation is assured.

During off periods, the potentials of the outer ends of the capacitors 23 and 24 diverge slowly, the design being such that any net current into their common ends is too small to affect the following stage of the circuit (to be described hereinafter). Such net current may be caused by slight imbalance of resistors 17 and 18, of capacitors 23, 24 or of capacitors 10 and 12.

At turn on of the transistors 13 and 14, the capacitors 23 and 24 discharge very rapidly causing an abrupt change in the potential on their common ends, if the capacitances of the capacitors 10 and 12 are not equal.

In normal conditions the capacitance of the probe 10 (being immersed in the liquid to be detected) is greater than that of the capacitor 12. In this case there will be a negative going excursion of the common point of the capacitors 23, 24 when the transistors 13, 14 turn on. Conversely when the liquid level is low there will be a positive going excursion of the potential at the common point of the capacitors 23 and 24. The rail 15 is supplied from a positive supply terminal 27 via a resistor 28 and a zener diode 29 is connected between the rail 15 and the rail 16 to stabilise the voltage on rail 15. The rail 16 is connected directly to a negative terminal 30.

The common point of the capacitors 23 and 24 is connected to the base of a transistor 31 which has its emitter connected to the rail 16 and its collector connected via a resistor 32 to the terminal 27. The base of the transistor 31 is also connected to the rail 27 via a resistor 33 so that the transistor 31 is biased to conduct. The collector of the transistor 31 is connected to the base of a transistor 34 which has its collector connected to the terminal 27 via a resistor 35 and its emitter connected to the rail 16 via a resistor 36. A capacitor 37 is connected between the collector and emitter of the transistor 34 and the collector of the transistor 34 is connected to the base of a transistor 38 the emitter of which is connected via a resistor 39 to the rail 16. The collector of the transistor 38 is connected to the collector of a power transistor 40 the base of which is connected to the emitter of the transistor 38 and the emitter of which is connected to the emitter of the transistor 34. The collectors of the transistors 38 and 40 are connected via a warning lamp 41 to the terminal 27.

When the signal at the common point of the capacitors 23 and 24 has a negative going excursion the transistor 31 is switched off once in every cycle of the oscillator. This causes the transistor 34 to be switched on once in every cycle of the oscillator thereby keeping the capacitor 37 discharged to prevent the transistors 38 and 40 conducting. The lamp 41 does not therefore light up. When, on the other hand, there is a positive going excursion on the common point of the capacitors 23 and 24 the transistors 31 will not be switched off but will remain conducting. This means that the transistor 34 will be permanently switched off and capacitor 37 can charge up to a level such that the transistors 38 and 40 both conduct and the lamp 41 is illuminated. The resistor 36 introduces a small amount of regenerative feedback into the switching action to minimise the dissipation in the transistor 40.

It will be noted that the circuit described includes no coils and is therefore, as mentioned above, readily adapted for production as a micro integrated circuit. The circuit can readily be designed for low impedance operation and can be operated on a relatively low supply voltage.

Finally it will be noticed that the warning circuit is such that if the connection between the oscillator and the warning circuit is broken the warning light will come on and this will also occur if the probe 10 becomes detached.

The capacitors 25 and 26 merely ensure that no d.c. can be drawn from the terminals to which the probe 10 and the reference capacitor 12 are connected. These are nominally of equal value and do not, therefore, have any other effect on the circuit. The capacitors 23, 24, 25 and 26 are all of large capacitance as compared with that of the probe 10 and reference 12.

It will be appreciated that although the above example has been described as using capacitors 23, 24 of identical value, different values may be employed. In this case the capacitive bridge constituted by the capacitors 23, 24 the probe 10 and the reference capacitor 12 will be in balance when the ratio of the capacitances of the probe 10 and the reference capacitor 12 is equal to the ratio of the capacitances of the capacitors 23, 24.

We claim:

1. A liquid level detector circuit comprising:

first and second supply terminals for connection to opposite respective terminals of d.c. supply;

capacitive probe means having first and second terminals, said first terminal being connected to said first supply terminal;

reference capacitor means having first and second terminals, said first terminal being connected to said first supply terminal;

switch means having two terminals which are connected to the first and second supply terminals respectively and which are connected respectively to the second terminals of said capacitive probe means and said reference capacitor means, said switch means having a first condition in which a current path is established between the terminals of the switch means so that said second terminals of the capacitive probe means and the reference capacitor means are interconnected, and a second condition in which said current path is interrupted so that two different potentials are imposed on the second terminals of the capacitive probe means and the reference capacitor means respectively, whereby there is an excursion of the mean potential on said second terminals of said capacitive probe means and said reference capacitor means when the switch means change from their second condition to their first condition;

means connected to the second terminals of said capacitive probe means and said reference capacitor means to detect the mean potential on said second terminals; and a warning circuit connected to the detecting means and sensitive to the sense of the excursion of the mean potential on said second terminals when said switch means change from their second condition to their first condition.

2. A circuit as claimed in claim 1 in which the switch means comprise a pair of transistors connected to said second terminals of the capacitive probe means and the reference capacitor means to act as a switch.

3. A circuit as claimed in claim 2 in which said transistors are complementary, each having its base connected to the collector of the other and to a point in a respective one of a pair of resistive potential dividers, the emitters of the two transistors being connected by respective ones of a pair of resistors to said first and second supply terminals respectively and to said two terminals respectively of the switch means.

4. A circuit as claimed in claim 1 wherein said detector means comprise a pair of capacitors connected in series between said second terminals of the capacitive probe means and the reference capacitor means, the common terminal of said pair of capacitors being connected to the warning circuit.

5. A circuit as claimed in claim 1 in which the warning circuit includes a first transistor normally biased to conduct, a second transistor connected to be controlled by the first transistor, a capacitor connected across the collector emitter of the second transistor in a capacitor charging circuit which is arranged so that the capacitor is discharged whenever the first transistor is turned off, and an output stage controlled by said capacitor to switch on a warning device when said capacitor becomes charged to more than a predetermined voltage.

6. A circuit as claimed in claim 5 in which the output stage includes a resistor in said capacitor charging circuit arranged to provide regenerative feedback when the output stage is turned on and off.

* * * * *